(12) United States Patent
Liu

(10) Patent No.: US 11,543,742 B2
(45) Date of Patent: Jan. 3, 2023

(54) LIGHT SOURCE MODULE AND PROJECTION DEVICE

(71) Applicant: DELTA ELECTRONICS, INC., Taoyuan (TW)

(72) Inventor: Kai-Ming Liu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 42 days.

(21) Appl. No.: 17/376,144

(22) Filed: Jul. 14, 2021

(65) Prior Publication Data

US 2022/0252970 A1 Aug. 11, 2022

(30) Foreign Application Priority Data

Feb. 9, 2021 (CN) .......................... 202110177423.0

(51) Int. Cl.
| | |
|---|---|
| *G03B 21/20* | (2006.01) |
| *G02B 13/00* | (2006.01) |
| *G02B 27/10* | (2006.01) |
| *G02B 27/14* | (2006.01) |
| *G02B 5/10* | (2006.01) |

(52) U.S. Cl.
CPC ........... *G03B 21/2066* (2013.01); *G02B 5/10* (2013.01); *G02B 13/0095* (2013.01); *G02B 27/108* (2013.01); *G02B 27/14* (2013.01)

(58) Field of Classification Search
CPC ................ G03B 21/2066; G03B 21/20; G03B 21/2006; G03B 21/2033; G03B 21/00; G03B 21/2073; G02B 5/10; G02B 13/0095; G02B 27/108; G02B 27/14
See application file for complete search history.

(56) References Cited

U.S. PATENT DOCUMENTS

| | | | |
|---|---|---|---|
| 2018/0259837 A1* | 9/2018 | Akiyama | ........... G03B 21/2013 |
| 2018/0275495 A1* | 9/2018 | Egawa | ................... G02B 7/028 |
| 2021/0141301 A1 | 5/2021 | Homma et al. | |

FOREIGN PATENT DOCUMENTS

| | | |
|---|---|---|
| CN | 102193285 A | 9/2011 |
| CN | 106324965 A | 1/2017 |
| CN | 106324965 B | 6/2018 |
| CN | 110597001 A | 12/2019 |
| CN | 110832396 A | 2/2020 |
| TW | 200933071 A | 8/2009 |
| TW | M393706 U1 | 12/2010 |
| TW | 201133116 A1 | 10/2011 |
| TW | 201248297 A1 | 12/2012 |

\* cited by examiner

*Primary Examiner* — Bao Q Truong
(74) *Attorney, Agent, or Firm* — CKC & Partners Co., LLC

(57) ABSTRACT

A light source module includes a solid-state light emitter, a reflective mirror, a light integration box, and a light sensor. The solid-state light emitter is configured to emit light. The reflective mirror is configured to turn a first part of the light and allow a second part of the light to pass. The light integration box is disposed in a path of the second part of the light and has an entrance. The second part of the light passes through the entrance to enter into the light integration box and is uniformly mixed in the light integration box. The light sensor is disposed on the light integration box to receive the second part of the light.

11 Claims, 9 Drawing Sheets

LIGHT SOURCE MODULE AND PROJECTION DEVICE

CROSS-REFERENCE TO RELATED APPLICATION

This application claims priority to China Application Serial Number 202110177423.0, filed Feb. 9, 2021, which is herein incorporated by reference.

BACKGROUND

Technical Field

The present disclosure relates to a light source module and a projection device.

Description of Related Art

In recent years, optical projectors have been used in many fields, and the scope of applications is also expanding day by day (e.g., from consumer products to high-tech equipment). Various optical projectors are also widely used in schools, homes and commercial occasions to enlarge the display pattern provided by the signal source and display it on the projection screen.

In a laser projector, auto white balance (AWB) is a method to solve the problem of white balance shift caused by different decay rate of the blue laser diode, and yellow phosphor (and red laser diodes) when time goes by. The internal calibration is a conventional method that uses the light sensing value of laser maximum power as white balance target. However, the position of the light sensor and the reflected light from the optical engine also mean that the lighting system and the light valve (such as DMD panel) will also affect the accuracy of the light sensing value. In addition, when the uniformity of light sources in different positions (such as laser diode arrays) is not good, it will also cause erroneous determination by the light sensor and result in excessive auto white balance deviation.

Accordingly, how to provide a light source module to solve the aforementioned problems becomes an important issue to be solved by those in the industry.

SUMMARY

An aspect of the disclosure is to provide a light source module that can efficiently solve the aforementioned problems.

According to an embodiment of the disclosure, a light source module includes a solid-state light emitter, a reflective mirror, a light integration box, and a light sensor. The solid-state light emitter is configured to emit light. The reflective mirror is configured to turn a first part of the light and allow a second part of the light to pass. The light integration box is disposed in a path of the second part of the light and has an entrance. The second part of the light passes through the entrance to enter into the light integration box and is uniformly mixed in the light integration box. The light sensor is disposed on the light integration box to receive the second part of the light.

In an embodiment of the disclosure, the light source module further includes a relay lens. The reflective mirror has a reflecting plane. The reflecting plane is configured to reflect the first part of the light to the relay lens.

In an embodiment of the disclosure, the reflective mirror has a reflecting paraboloid. The reflecting paraboloid is configured to reflect the first part of the light.

In an embodiment of the disclosure, the light source module further includes a reflector configured to reflect the second part of the light to the entrance.

In an embodiment of the disclosure, the light source module further includes a relay lens. The reflector has a reflecting plane. The relay lens is located between the reflective mirror and the reflector and configured to transfer the second part of the light to the reflecting plane.

In an embodiment of the disclosure, the reflector has a reflecting paraboloid. The reflecting paraboloid is configured to reflect the second part of the light.

In an embodiment of the disclosure, the light source module further includes a diffuser disposed at the entrance of the light integration box.

According to an embodiment of the disclosure, a projection device includes the light source module and an optical engine. The optical engine is configured to receive the first part of the light.

In an embodiment of the disclosure, the projection device further includes an optical fiber. The light source module and the optical engine are optically coupled to two ends of the optical fiber, respectively.

In an embodiment of the disclosure, the projection device further includes two housings separated from each other. The light source module and the optical engine are respectively disposed in the two housings.

In an embodiment of the disclosure, the projection device further includes a housing. The light source module and the optical engine are disposed in the housing.

Accordingly, in the light source module and the projection device of the present disclosure, the reflective mirror turns the first part of the light emitted by the solid-state light emitter for illumination, and allows the second part of the light emitted by the light emitter to pass through and reach the light integration box. Therefore, the light integration box can be disposed at a position that will not be affected by the reflected light of the first part of the light, thereby improving the accuracy of the light sensing value generated by the light sensor in the light integration box. In this way, the white balance correction based on the light sensing value can also have better accuracy.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
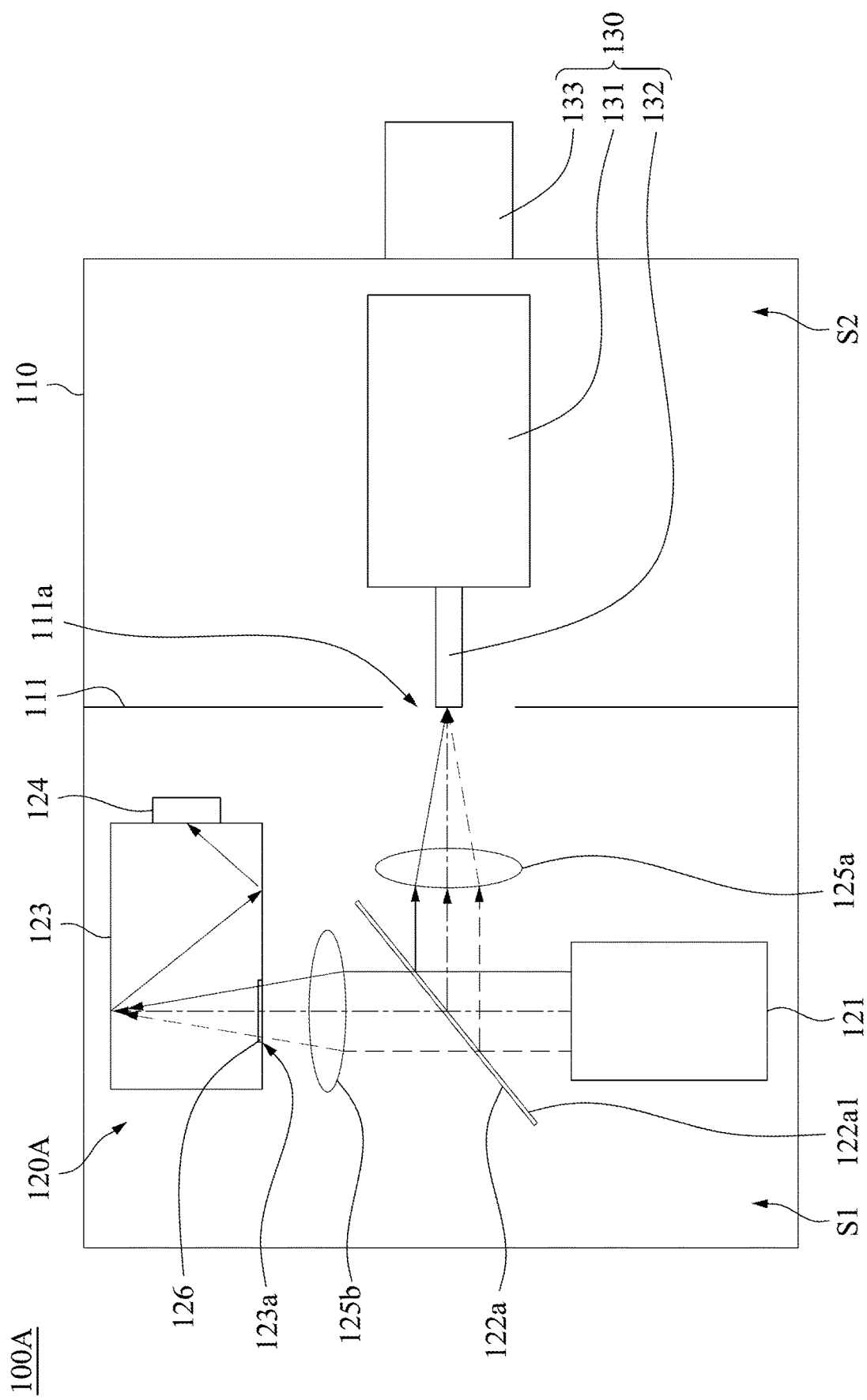
FIG. 1 is a perspective view of a projection device according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a perspective view of a projection device 100A according to an embodiment of the present disclosure. As shown in FIG. 1, in the present embodiment, the projection device 100A includes a housing 110, a light source module 120A, and an opto-mechanical module 130. The housing 110 includes a partition 111 that partitions the interior of the housing 110 into a first space S1 and a second space S2. The light source module 120A is disposed in the first space S1 of the housing 110. The opto-mechanical module 130 is at least partially disposed in the second space S2 of the housing 110. The opto-mechanical module 130 includes an integrating rod 132, an optical engine 131, and a projection lens 133. The integrating rod 132 and the optical engine 131 are disposed in the second space S2 of the housing 110, and the projection lens 133 is exposed outside the housing 110.

As shown in FIG. 1, in the present embodiment, the light source module 120A includes a solid-state light emitter 121, a reflective mirror 122a, a light integration box 123, and a light sensor 124. The solid-state light emitter 121 is configured to emit light. The reflective mirror 122a is configured to turn a first part of the light and allow a second part of the light to pass. The light integration box 123 is disposed in a path of the second part of the light and has an entrance 123a. The second part of the light passes through the entrance 123a to enter into the light integration box 123 and is uniformly mixed in the light integration box 123. The light sensor 124 is disposed on the light integration box 123 to receive the second part of the light. With this optical path configuration, the light integration box 123 can be disposed at a position that will not be affected by the reflected light of the first part of the light, thereby improving the accuracy of the light sensing value generated by the light sensor 124 in the light integration box 123. In this way, the white balance correction based on the light sensing value can also have better accuracy.

In detail, as shown in FIG. 1, in the present embodiment, the light source module 120A further includes a first relay lens 125a. The first relay lens 125a is located between the reflective mirror 122a and the integrating rod 132 of the opto-mechanical module 130. The reflective mirror 122a has a reflecting plane 122a1. The reflecting plane 122a1 is configured to reflect the first part of the light emitted by the solid-state light emitter 121 to the first relay lens 125a. Then, the first part of the light can be focused by the first relay lens 125a to the integrating rod 132 of the opto-mechanical module 130. The optical engine 131 is configured to process the first part of the light collected by the integrating rod 132 into a projection image, and the projection lens 133 is configured to project the projection image to a predetermined position (for example, a projection screen) outside the projection device 100A.

In some embodiments, the reflective mirror 122a is provided with a coating with high reflectivity. In some embodiments, the second part of the light passing through the reflective mirror 122a accounts for about 1% of the light emitted by the solid-state light emitter 121 (that is, the first part of the light reflected by the reflective mirror 122a accounts for about 99% of the light emitted by the solid-state light emitter 121), but the disclosure is not limited in this regard.

In addition, as shown in FIG. 1, in the present embodiment, the light source module 120A further includes a second relay lens 125b. The second relay lens 125b is located between the reflective mirror 122a and the entrance 123a of the light integration box 123. Hence, the second part of the light emitted by the solid-state light emitter 121 can be focused into the light integration box 123 by the second relay lens 125b after passing through the reflective mirror 122a.

In some other embodiments, if the second part of the light passing through the reflective mirror 122a can enter the light integration box 123 through the entrance 123a without the second relay lens 125b, the second relay lens 125b can be omitted.

As shown in FIG. 1, in the present embodiment, the light source module 120A further includes a diffuser 126. The diffuser 126 is disposed at the entrance 123a of the light integration box 123, and can increase the uniformity of the diffusion of the light (for example, laser light) passing through it, thereby improving the sensing effect of the light sensor 124.

In some embodiments, the inner surface of the light integration box 123 is provided with a reflective layer, so as to reduce the loss of the second part of the light entering the light integration box 123 when it reaches the light sensor 124. In some embodiments, the aforementioned reflective layer is a white ink layer, but the disclosure is not limited in this regard.

In some embodiments, the solid-state light emitter 121 includes a red laser diode, a green laser diode, and a blue laser diode, but the disclosure is not limited in this regard.

Figure 2:
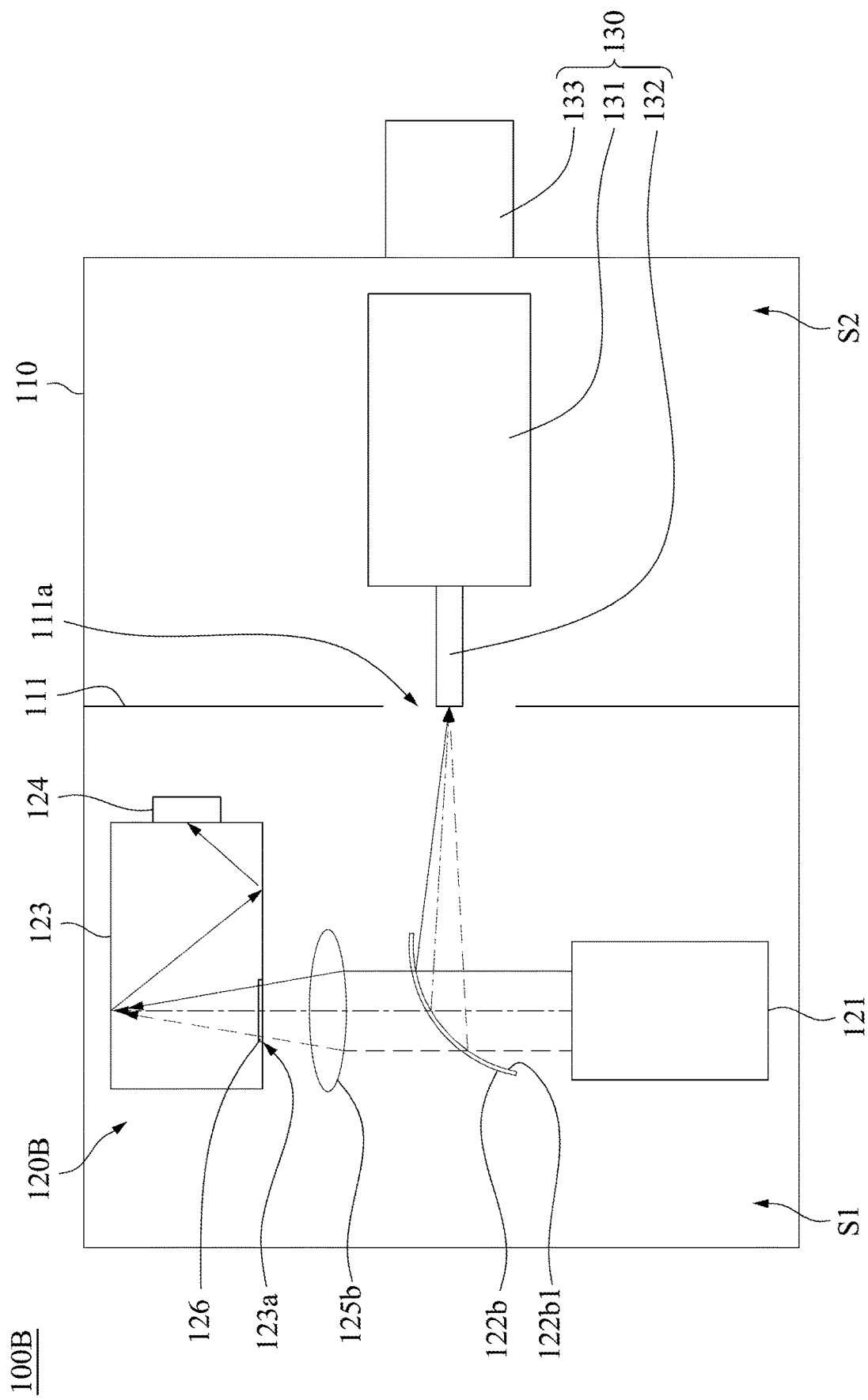
FIG. 2 is a perspective view of a projection device according to another embodiment of the present disclosure.

Reference is made to FIG. 2. FIG. 2 is a perspective view of a projection device 100B according to another embodiment of the present disclosure. As shown in FIG. 2, in the present embodiment, the projection device 100B includes a housing 110, a light source module 120B, and an opto-mechanical module 130, in which the housing 110 and the opto-mechanical module 130 are identical or similar to those disclosed in the embodiment shown in FIG. 1, so they will not be introduced again here and can be referred to the above related descriptions. The present embodiment is modified for the light source module 120A shown in FIG. 1. Specifically, the light source module 120B of the present embodiment includes a solid-state light emitter 121, a reflective mirror 122b, a light integration box 123, a light sensor 124, a second relay lens 125b, and a diffuser 126, in which the solid-state light emitter 121, the light integration box 123, the light sensor 124, the second relay lens 125b, and the diffuser 126 are identical or similar to those disclosed in the embodiment shown in FIG. 1, so they will not be introduced again here and can be referred to the above related descriptions.

In particular, the light source module 120B of the present embodiment uses a reflective mirror 122b instead of the combination of the reflective mirror 122a and the first relay lens 125a in the embodiment shown in FIG. 1. In detail, the reflective mirror 122b of the present embodiment has a reflecting paraboloid 122b1. The reflecting paraboloid 122b1 is configured to reflect the first part of the light. Furthermore, the reflecting paraboloid 122b1 of the reflective mirror 122b also has the function of focusing. Therefore, when the light emitted by the solid-state light emitter 121 reaches the reflective mirror 122b, the reflecting paraboloid 122b1 of the reflective mirror 122b will simultaneously reflect and focus the first part of the light to the integrating rod 132 of the opto-mechanical module 130. Then, the optical engine 131 will process the first part of the light collected by the integrating rod 132 into a projection image. Finally, the projection lens 133 will project the projection image to a predetermined position outside the projection device 1008. In addition, the reflective mirror 122b of the present embodiment is also configured to allow the second part of the light to pass through. In detail, the second part of the light emitted by the solid-state light emitter 121 can be focused into the light integration box 123 by the second relay lens 125b after passing through the reflective mirror 122b.

With the aforementioned optical path configuration, the light integration box 123 can also be disposed at a position that will not be affected by the reflected light of the first part of the light, thereby improving the accuracy of the light sensing value generated by the light sensor 124 in the light integration box 123. In this way, the white balance correction based on the light sensing value can also have better accuracy.

Figure 3:
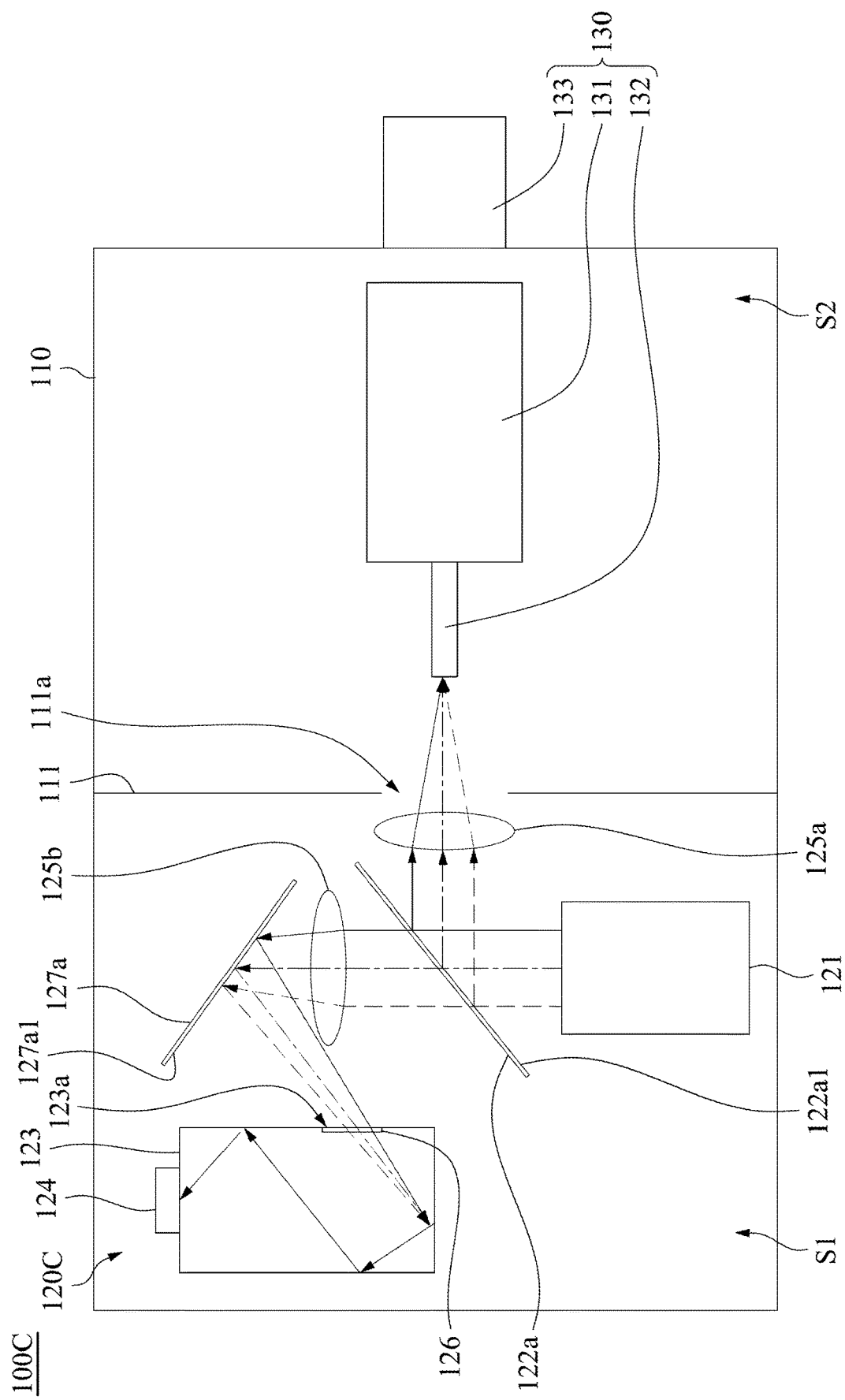
FIG. 3 is a perspective view of a projection device according to another embodiment of the present disclosure.

Reference is made to FIG. 3. FIG. 3 is a perspective view of a projection device 100C according to another embodiment of the present disclosure. As shown in FIG. 3, in the present embodiment, the projection device 100C includes a housing 110, a light source module 120C, and an opto-mechanical module 130, in which the housing 110 and the opto-mechanical module 130 are identical or similar to those disclosed in the embodiment shown in FIG. 1, so they will not be introduced again here and can be referred to the above related descriptions. The present embodiment is modified for the light source module 120A shown in FIG. 1. Specifically, the light source module 120C of the present embodiment includes a solid-state light emitter 121, a reflective mirror 122a, a light integration box 123, a light sensor 124, a first relay lens 125a, a second relay lens 125b, a diffuser 126, and a reflector 127a, in which the solid-state light emitter 121, the light integration box 123, the light sensor 124, the first and second relay lenses 125a, 125b, and the diffuser 126 are identical or similar to those disclosed in the embodiment shown in FIG. 1, so they will not be introduced again here and can be referred to the above related descriptions.

After the reflecting plane 122a1 of the reflective mirror 122a reflects the first part of the light emitted by the solid-state light emitter 121 to the first relay lens 125a, the first part of the light can be focused by the first relay lens 125a to the integrating rod 132 of the opto-mechanical module 130. Then, the optical engine 131 will process the first part of the light collected by the integrating rod 132 into a projection image. Finally, the projection lens 133 will project the projection image to a predetermined position outside the projection device 100C. In particular, the difference between the present embodiment and the embodiment shown in FIG. 1 is that the light source module 120C of the present embodiment further includes the reflector 127a. The reflector 127a is configured to reflect the second part of the light to the entrance 123a of the light integration box 123. Specifically, the reflector 127a has a reflecting plane 127a1. The second relay lens 125b is located between the reflective mirror 122a and the reflector 127a, and is configured to focus the second part of the light and transmit it to the reflecting plane 127a1.

It should be noted that, in the present embodiment, at least the reflective mirror 122a, the first and second relay lenses 125a, 125b, and the reflector 127a are interposed between the entrance 123a of the light integration box 123 and the opto-mechanical module 130. With the aforementioned optical path configuration, the light integration box 123 can also be disposed at a position that will not be affected by the reflected light of the first part of the light, thereby improving the accuracy of the light sensing value generated by the light sensor 124 in the light integration box 123. In this way, the white balance correction based on the light sensing value can also have better accuracy.

In some other embodiments, if the second part of the light passing through the reflective mirror 122a can enter the light integration box 123 through the entrance 123a without the second relay lens 125b before being reflected by the reflector 127a, the second relay lens 125b can be omitted.

Figure 4:
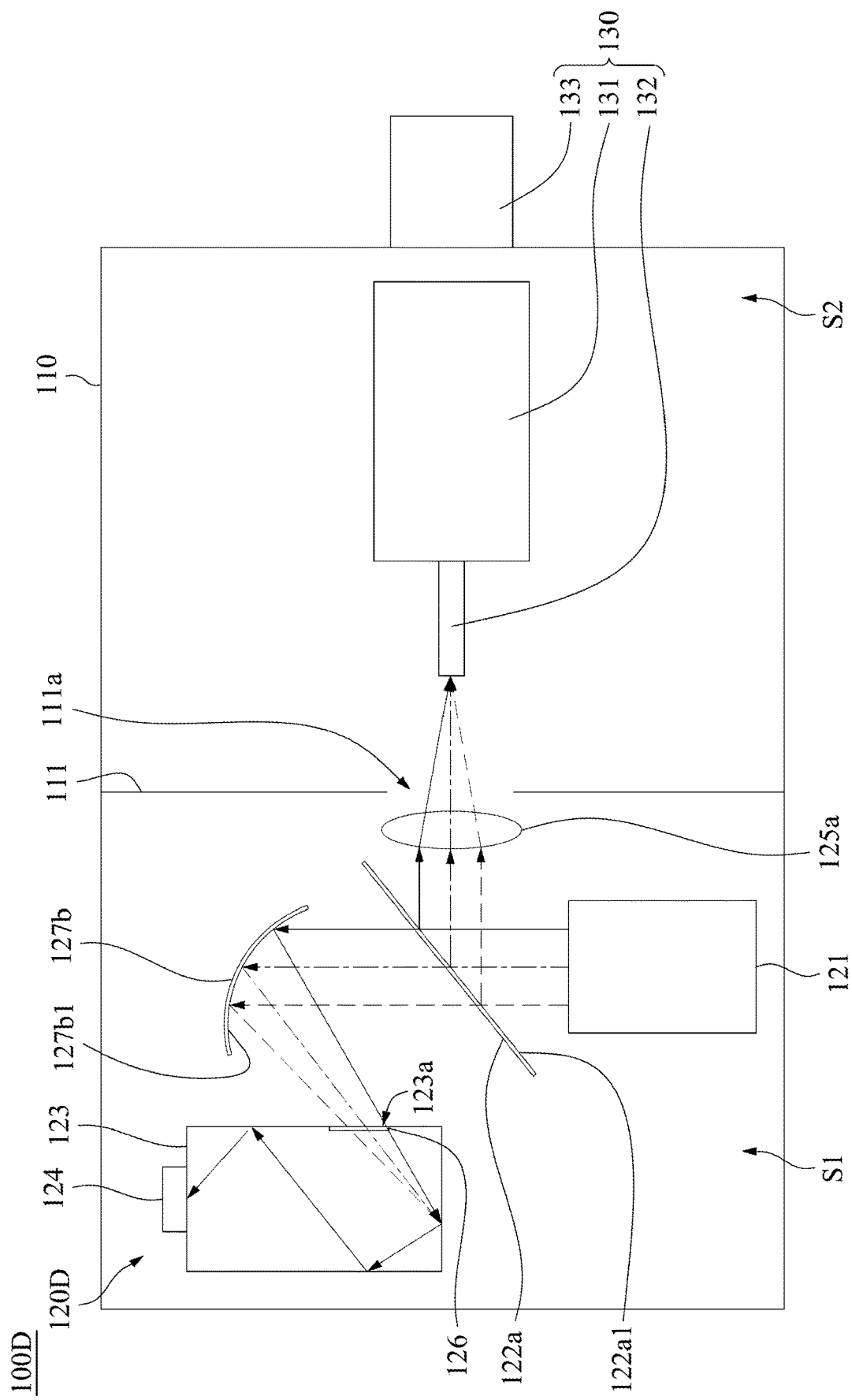
FIG. 4 is a perspective view of a projection device according to another embodiment of the present disclosure.

Reference is made to FIG. 4. FIG. 4 is a perspective view of a projection device 100D according to another embodiment of the present disclosure. As shown in FIG. 4, in the present embodiment, the projection device 100D includes a housing 110, a light source module 120D, and an opto-mechanical module 130, in which the housing 110 and the opto-mechanical module 130 are identical or similar to those disclosed in the embodiment shown in FIG. 3, so they will not be introduced again here and can be referred to the above related descriptions. The present embodiment is modified for the light source module 120C shown in FIG. 3. Specifically, the light source module 120D of the present embodiment includes a solid-state light emitter 121, a reflective mirror 122a, a light integration box 123, a light sensor 124, a first relay lens 125a, a diffuser 126, and a reflector 127b, in which the solid-state light emitter 121, the light integration box 123, the light sensor 124, the first relay lens 125a, and the diffuser 126 are identical or similar to those disclosed in the embodiment shown in FIG. 3, so they will not be introduced again here and can be referred to the above related descriptions.

After the reflecting plane 122a1 of the reflective mirror 122a reflects the first part of the light emitted by the solid-state light emitter 121 to the first relay lens 125a, the first part of the light can be focused by the first relay lens 125a to the integrating rod 132 of the opto-mechanical module 130. Then, the optical engine 131 will process the first part of the light collected by the integrating rod 132 into a projection image. Finally, the projection lens 133 projects the projection image to a predetermined position outside the projection device 100D. In particular, the light source module 120D of the present embodiment replaces the combination of the reflector 127a and the second relay lens 125b in the embodiment shown in FIG. 3 with a reflector 127b. In detail, the reflector 127b of the present embodiment has a reflecting paraboloid 127b1. The reflecting paraboloid 127b1 is configured to reflect the second part of the light. In addition, the reflecting paraboloid 127b1 of the reflector 127b also has a focusing function. Therefore, when the second part of the light passing through the reflective mirror 122a reaches the reflector 127b, the reflecting paraboloid 127b1 of the reflector 127b will reflect the second part of the light and focus it into the light integration box 123.

It should be noted that, in the present embodiment, at least the reflective mirror 122a, the first relay lens 125a, and a reflector 127b are interposed between the entrance 123a of the light integration box 123 and the opto-mechanical module 130. With the aforementioned optical path configuration, the light integration box 123 can also be disposed at a position that will not be affected by the reflected light of the first part of the light, thereby improving the accuracy of the light sensing value generated by the light sensor 124 in the light integration box 123. In this way, the white balance correction based on the light sensing value can also have better accuracy.

Figure 5:
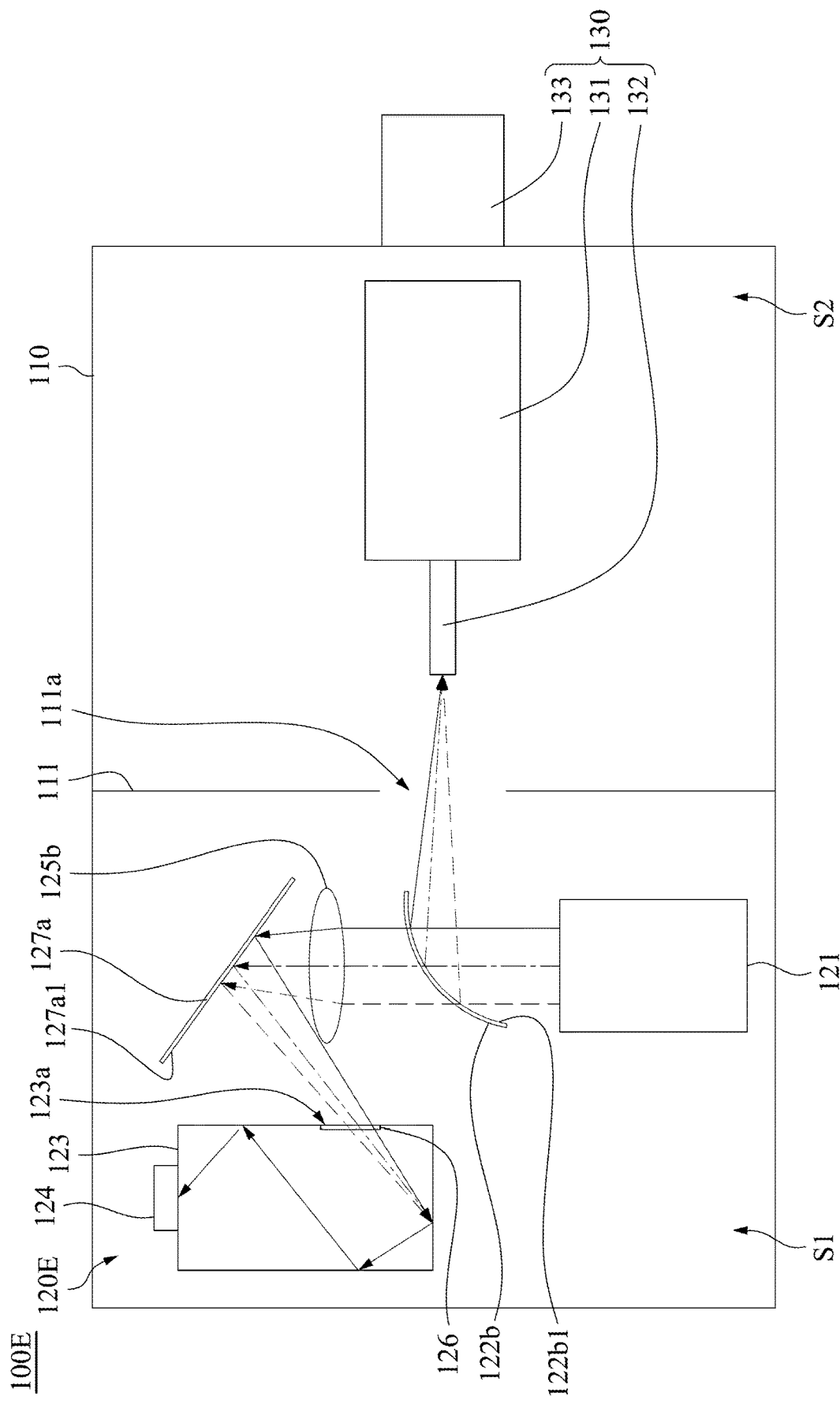
FIG. 5 is a perspective view of a projection device according to another embodiment of the present disclosure.

Reference is made to FIG. 5. FIG. 5 is a perspective view of a projection device 100E according to another embodiment of the present disclosure. As shown in FIG. 5, in the present embodiment, the projection device 100E includes a housing 110, a light source module 120E, and an opto-mechanical module 130, in which the housing 110 and the opto-mechanical module 130 are identical or similar to those disclosed in the embodiment shown in FIG. 3, so they will not be introduced again here and can be referred to the above related descriptions. The present embodiment is modified for the light source module 120C shown in FIG. 3. Specifically, the light source module 120E of the present embodiment includes a solid-state light emitter 121, a reflective mirror 122b, a light integration box 123, a light sensor 124, a second relay lens 125b, a diffuser 126, and a reflector 127a, in which the solid-state light emitter 121, the light integration box 123, the light sensor 124, the second relay lens 125b, the diffuser 126, and the reflector 127a are identical or similar to those disclosed in the embodiment shown in FIG. 3, so they will not be introduced again here and can be referred to the above related descriptions.

In particular, the light source module 120E of the present embodiment uses the reflective mirror 122b instead of the combination of the reflective mirror 122a and the first relay lens 125a in the embodiment shown in FIG. 3. The reflective mirror 122b of the present embodiment is identical or similar to the embodiment shown in FIG. 2. In other words, the reflective mirror 122b of the present embodiment has a reflecting paraboloid 122b1, which also has a focusing function. Hence, the reflecting paraboloid 122b1 of the reflective mirror 122b will simultaneously reflect and focus the first part of the light to the integrating rod 132 of the opto-mechanical module 130. At the same time, the second part of the light emitted by the solid-state light emitter 121 can pass through the reflective mirror 122b, and then be focused into the light integration box 123 by the second relay lens 125b.

It should be noted that, in the present embodiment, at least the reflective mirror 122b, the second relay lens 125b, and the reflector 127a are interposed between the entrance 123a of the light integration box 123 and the opto-mechanical module 130. With the aforementioned optical path configuration, the light integration box 123 can also be disposed at a position that will not be affected by the reflected light of the first part of the light, thereby improving the accuracy of the light sensing value generated by the light sensor 124 in the light integration box 123. In this way, the white balance correction based on the light sensing value can also have better accuracy.

Figure 6:
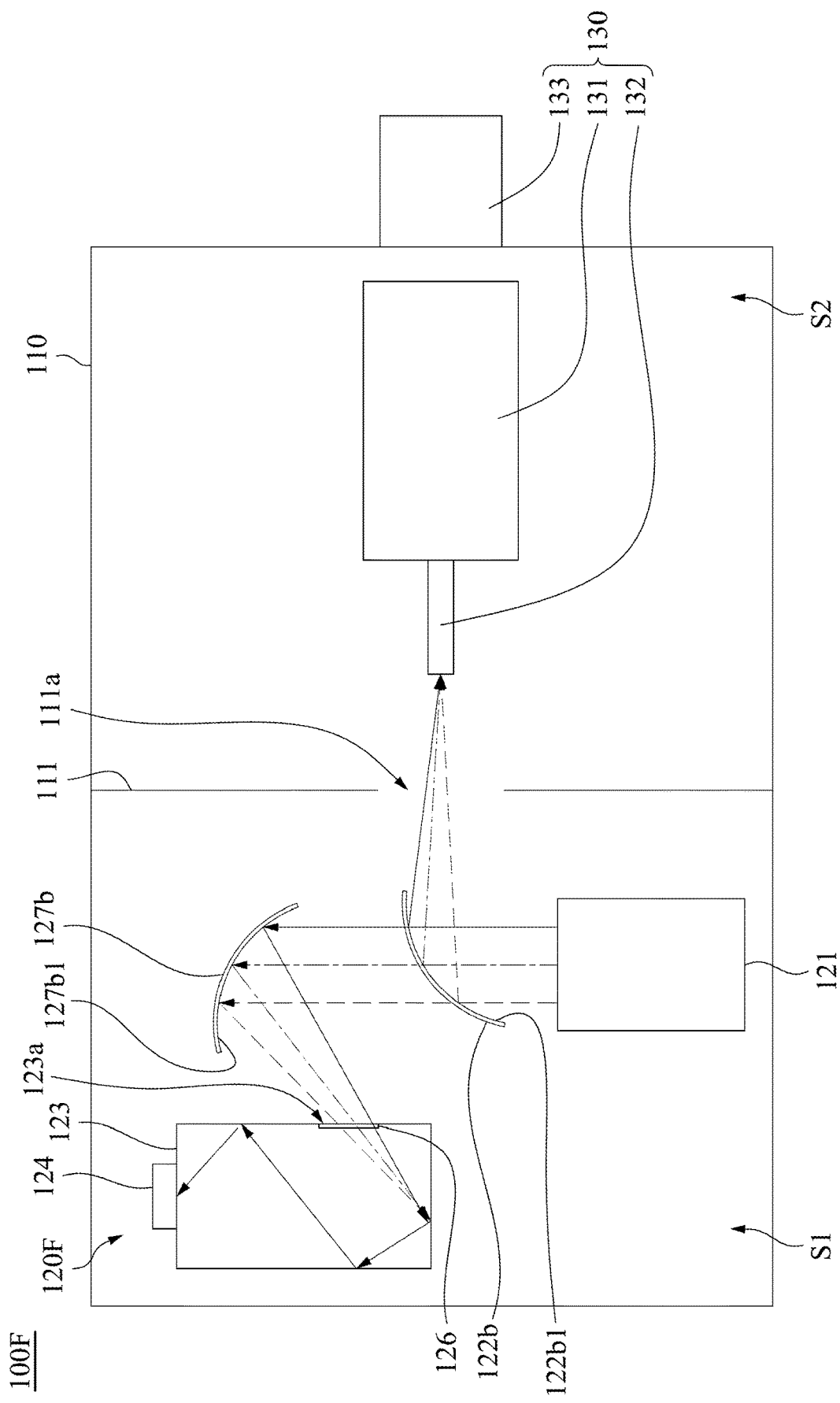
FIG. 6 is a perspective view of a projection device according to another embodiment of the present disclosure.

Reference is made to FIG. 6. FIG. 6 is a perspective view of a projection device 100F according to another embodiment of the present disclosure. As shown in FIG. 6, in the present embodiment, the projection device 100F includes a housing 110, a light source module 120F, and an opto-mechanical module 130, in which the housing 110 and the opto-mechanical module 130 are identical or similar to those disclosed in the embodiment shown in FIG. 3, so they will not be introduced again here and can be referred to the above related descriptions. The present embodiment is modified for the light source module 120E shown in FIG. 5. Specifically, the light source module 120F of the present embodiment includes a solid-state light emitter 121, a reflective mirror 122b, a light integration box 123, a light sensor 124, a diffuser 126, and a reflector 127b, in which the solid-state light emitter 121, the light integration box 123, the light sensor 124, and the diffuser 126 are identical or similar to those disclosed in the embodiment shown in FIG. 5, so they will not be introduced again here and can be referred to the above related descriptions.

The reflecting paraboloid 122b1 of the reflective mirror 122b is configured to reflect and focus the first part of the light emitted by the solid-state light emitter 121 to the integrating rod 132 of the opto-mechanical module 130. In particular, the light source module 120F of the present embodiment replaces the combination of the reflector 127a and the second relay lens 125b in the embodiment shown in FIG. 5 with a reflector 127b. In detail, the reflector 127b of the present embodiment is identical as or similar to the embodiment shown in FIG. 4, that is, it has a reflecting paraboloid 127b1. Therefore, when the second part of the light passing through the reflective mirror 122b reaches the reflector 127b, the reflecting paraboloid 127b1 of the reflector 127b will reflect and focus the second part of the light into the light integration box 123.

It should be noted that, in the present embodiment, at least the reflective mirror 122b and the reflector 127b are interposed between the entrance 123a of the light integration box 123 and the opto-mechanical module 130. With the aforementioned optical path configuration, the light integration box 123 can also be disposed at a position that will not be affected by the reflected light of the first part of the light, thereby improving the accuracy of the light sensing value generated by the light sensor 124 in the light integration box 123. In this way, the white balance correction based on the light sensing value can also have better accuracy.

In the above embodiments, any one of the light source modules 120A, 120B, 120C, 120D, 120E, and 120F and the opto-mechanical module 130 are disposed in the housing 110, but the disclosure is not limited in this regard.

Figure 7:
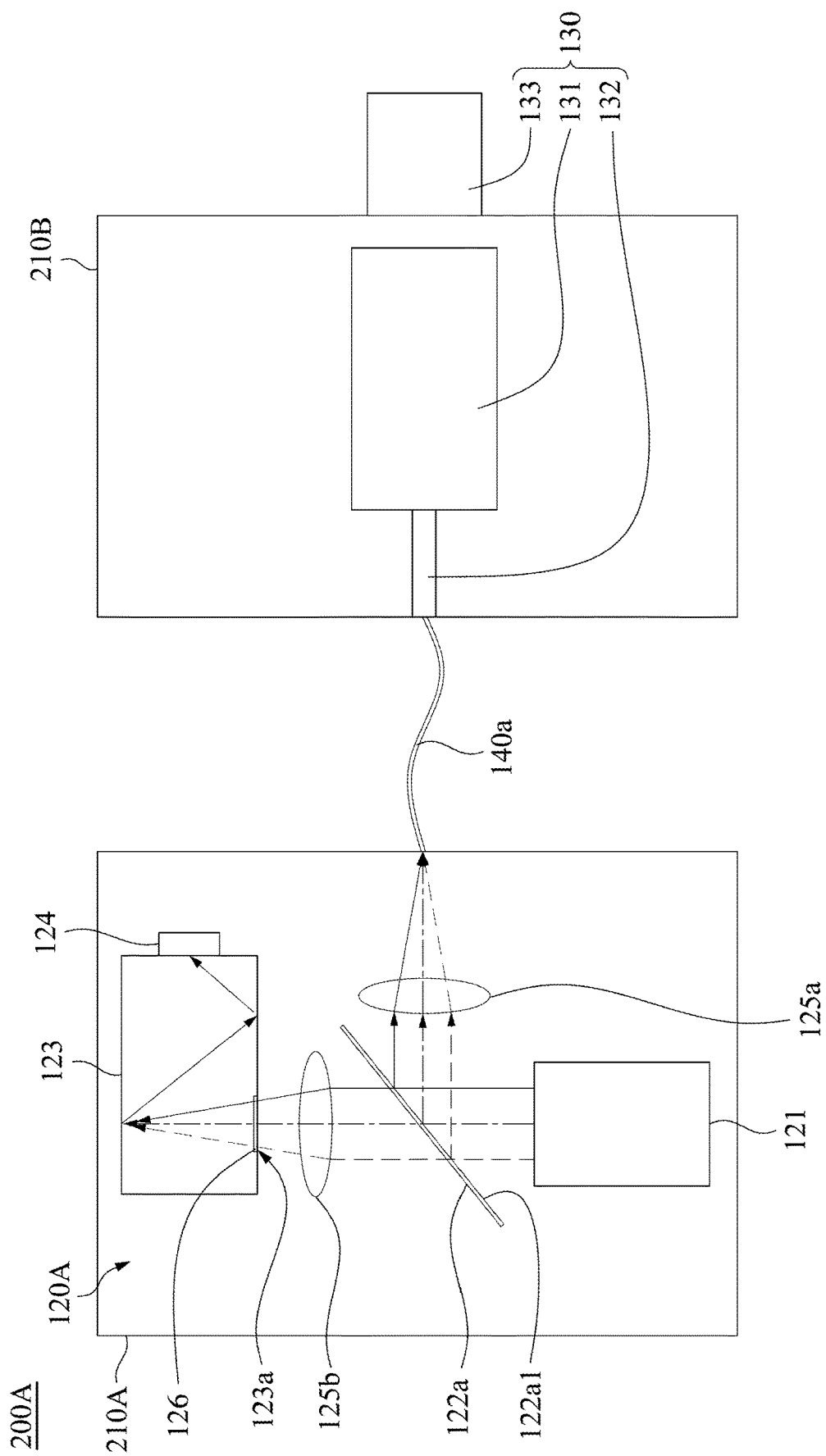
FIG. 7 is a perspective view of a projection device according to another embodiment of the present disclosure.

Reference is made to FIG. 7. FIG. 7 is a perspective view of a projection device 200A according to another embodiment of the present disclosure. As shown in FIG. 7, in the present embodiment, the projection device 200A includes two housings 210A, 210B separated from each other, a light source module 120A, and an opto-mechanical module 130. The light source module 120A is disposed in the housing 210A. The opto-mechanical module 130 is at least partially disposed in the housing 210B. The opto-mechanical module 130 includes an integrating rod 132, an optical engine 131, and a projection lens 133. The integrating rod 132 and the optical engine 131 are disposed in the housing 210B, and the projection lens 133 is exposed outside the housing 210B. In addition, the light source module 120A includes a solid-state light emitter 121, a reflective mirror 122a, a light integration box 123, a light sensor 124, a first relay lens 125a, a second relay lens 125b, and a diffuser 126, in which the optical path configuration of these components is identical or similar to that disclosed in the embodiment shown in FIG. 1, so it will not be introduced again here and can be referred to the above related descriptions.

In particular, the difference between the present embodiment and the embodiment shown in FIG. 1 is that the projection device 200A of the present embodiment changes the optical coupling way between the light source module 120A and the opto-mechanical module 130. Specifically, in the embodiment shown in FIG. 1, the first part of the light is directly focused by the first relay lens 125a to the integrating rod 132 of the opto-mechanical module 130 after being reflected by the reflecting plane 122a1 of the reflective mirror 122a. In the present embodiment, the projection device 200A further includes an optical fiber 140a. The light source module 120A and the optical engine 131 (via the integrating rod 132) are optically coupled to two ends of the optical fiber 140a, respectively. In other words, in the present embodiment, after being reflected by the reflecting plane 122a1 of the reflective mirror 122a, the first part of the light is first focused by the first relay lens 125a to enter the optical fiber 140a from one end of the optical fiber 140a, and then reaches the integrating rod 132 of the opto-mechanical module 130 through the other end of the optical fiber 140a. With this configuration, the flexibility of the optical path design of the projection device 200A of the present embodiment can be effectively increased.

It should be noted that although the optical configuration of the light source module 120A shown in FIG. 7 is identical or similar to the light source module 120A shown in FIG. 1 as an example, the present disclosure is not limited in this regard. In practical applications, the optical configuration of the light source module 120A shown in FIG. 7 can also be modified to be identical or similar to any of the light source modules 120B, 120C, 120D, 120E, 120F shown in FIGS. 2 to 6.

Figure 8:
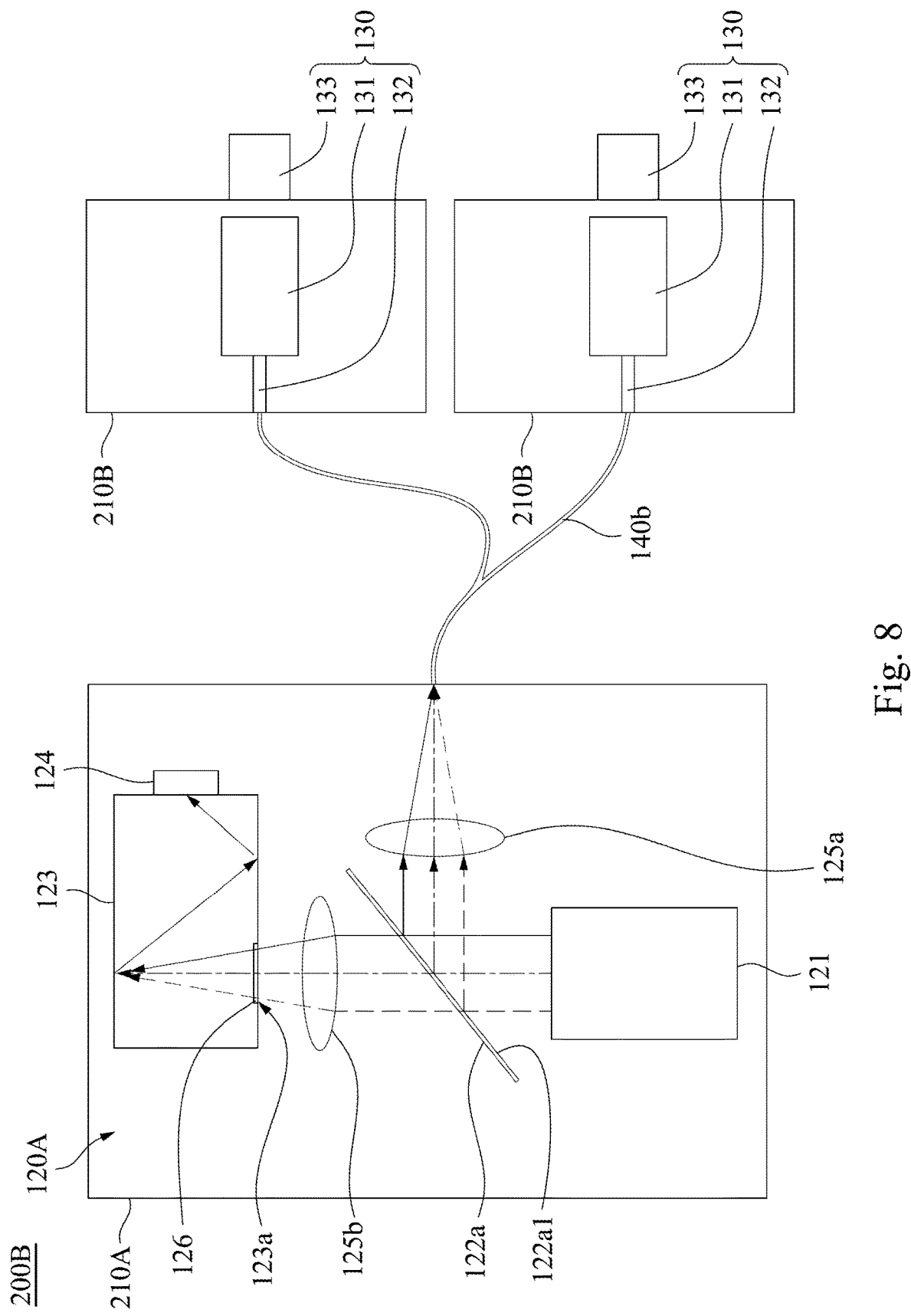
FIG. 8 is a perspective view of a projection device according to another embodiment of the present disclosure.

Reference is made to FIG. 8. FIG. 8 is a perspective view of a projection device 200B according to another embodiment of the present disclosure. As shown in FIG. 8, in the present embodiment, the projection device 200B includes two housings 210A, 210B, a light source module 120A, two opto-mechanical modules 130, and an optical fiber 140b, in which the housings 210A, 210B, the light source module 120A, and the opto-mechanical modules 130 are identical or similar to those disclosed in the embodiment shown in FIG. 7, so they will not be introduced again here and can be referred to the above related descriptions.

It should be noted that the optical fiber 140b of the present embodiment has one input end and two output ends. The light source module 120A is optically coupled to the input end of the optical fiber 140b, and the two opto-mechanical modules 130 are optically coupled to the two output ends of the optical fiber 140b, respectively. It can be seen that in the projection device 200B of the present embodiment, the two opto-mechanical modules 130 share the same light source module 120A and are configured to project the projection image to two different positions outside the projection device 200B. With this configuration, the applicability of the projection device 200B of the present embodiment can be effectively increased.

Figure 9:
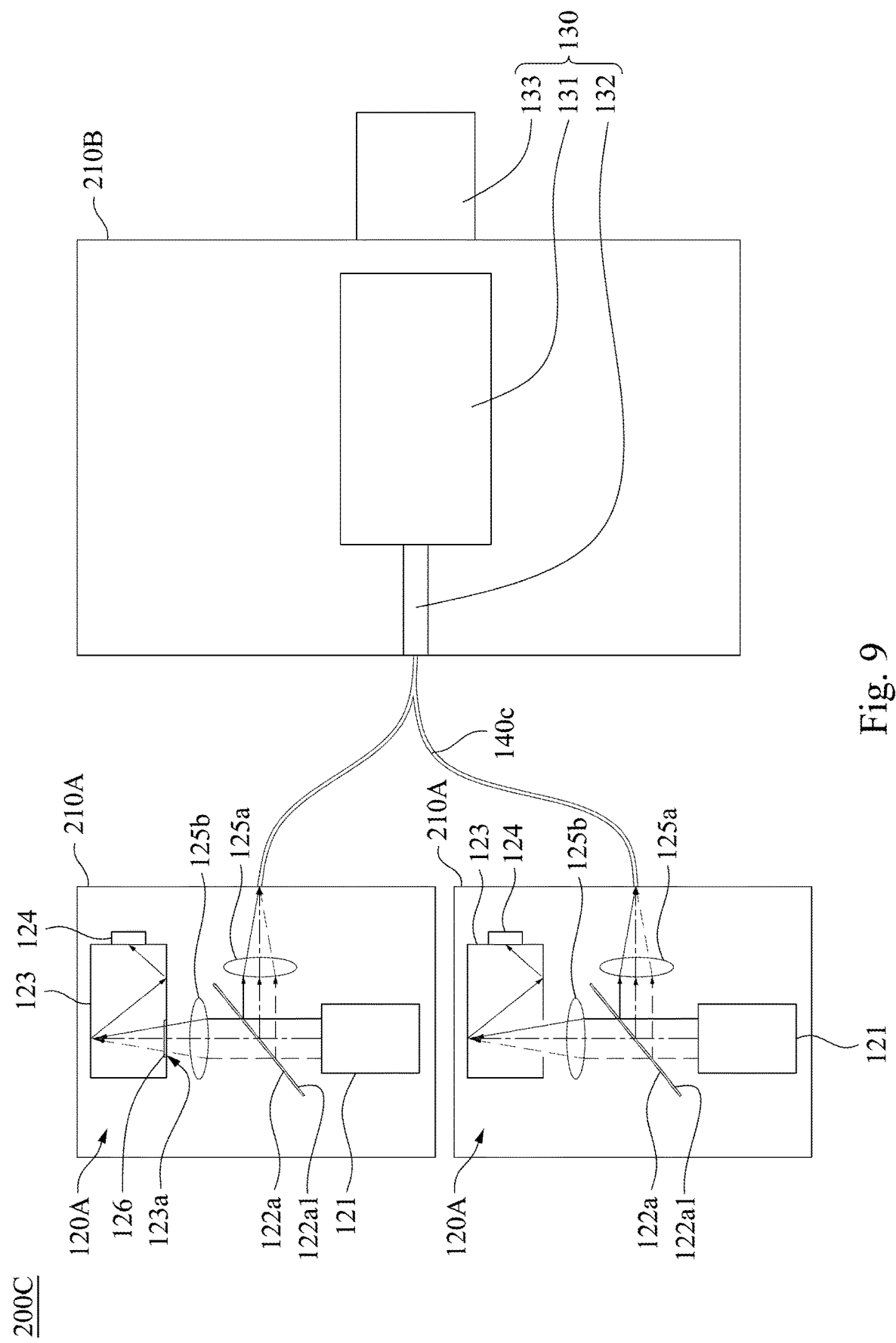
FIG. 9 is a perspective view of a projection device according to another embodiment of the present disclosure.

Reference is made to FIG. 9. FIG. 9 is a perspective view of a projection device 200C according to another embodiment of the present disclosure. As shown in FIG. 9, in the present embodiment, the projection device 200C includes two housings 210A, 210B, two light source modules 120A, an opto-mechanical module 130, and an optical fiber 140c, in which the housings 210A, 210B, the light source modules 120A, and the opto-mechanical module 130 are identical or similar to those disclosed in the embodiment shown in FIG. 7, so they will not be introduced again here and can be referred to the above related descriptions.

It should be noted that the optical fiber 140c of the present embodiment has two input ends and one output end. The two light source modules 120A are optically coupled to the two input ends of the optical fiber 140c respectively, and the opto-mechanical module 130 is optically coupled to the output end of the optical fiber 140b. It can be seen that in the projection device 200C of the present embodiment, the light generated by the two light source modules 120A is transmitted to the same opto-mechanical module 130. In practical applications, one of the light source modules 120A can be selectively made to emit light or the two light source modules 120A can be made to emit light at the same time. With this configuration, the brightness of the projection image generated by the optical engine 131 can be flexibly adjusted, or one of the light source modules 120A can be used as a backup light source when the other light source module 120A fails. In this way, the applicability of the projection device 200C of the present embodiment can be effectively increased.

According to the foregoing recitations of the embodiments of the disclosure, it can be seen that in the light source module and the projection device of the present disclosure, the reflective mirror turns the first part of the light emitted by the solid-state light emitter for illumination, and allows the second part of the light emitted by the light emitter to pass through and reach the light integration box. Therefore, the light integration box can be disposed at a position that will not be affected by the reflected light of the first part of the light, thereby improving the accuracy of the light sensing value generated by the light sensor in the light integration box. In this way, the white balance correction based on the light sensing value can also have better accuracy.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A light source module, comprising:
 a solid-state light emitter configured to emit light;
 a reflective mirror configured to turn a first part of the light and allow a second part of the light to pass;
 a light integration box disposed in a path of the second part of the light and having an entrance, the second part of the light passing through the entrance to enter into the light integration box and being uniformly mixed in the light integration box; and
 a light sensor disposed on the light integration box to receive the second part of the light.
2. The light source module of claim 1, further comprising a relay lens, wherein the reflective mirror has a reflecting plane, and the reflecting plane is configured to reflect the first part of the light to the relay lens.

3. The light source module of claim 1, wherein the reflective mirror has a reflecting paraboloid, and the reflecting paraboloid is configured to reflect the first part of the light.

4. The light source module of claim 1, further comprising a reflector configured to reflect the second part of the light to the entrance.

5. The light source module of claim 4, further comprising a relay lens, wherein the reflector has a reflecting plane, and the relay lens is located between the reflective mirror and the reflector and configured to transfer the second part of the light to the reflecting plane.

6. The light source module of claim 4, wherein the reflector has a reflecting paraboloid, and the reflecting paraboloid is configured to reflect the second part of the light.

7. The light source module of claim 1, further comprising a diffuser disposed at the entrance of the light integration box.

8. A projection device, comprising:

the light source module of claim 1; and an optical engine configured to receive the first part of the light.

9. The projection device of claim 8, further comprising an optical fiber, wherein the light source module and the optical engine are optically coupled to two ends of the optical fiber, respectively.

10. The projection device of claim 9, further comprising two housings separated from each other, wherein the light source module and the optical engine are respectively disposed in the two housings.

11. The projection device of claim 8, further comprising a housing, wherein the light source module and the optical engine are disposed in the housing.

* * * * *